J. A. RINGLE.
FENDER.
APPLICATION FILED DEC. 13, 1920.
1,392,223.
Patented Sept. 27, 1921.
2 SHEETS—SHEET 1.
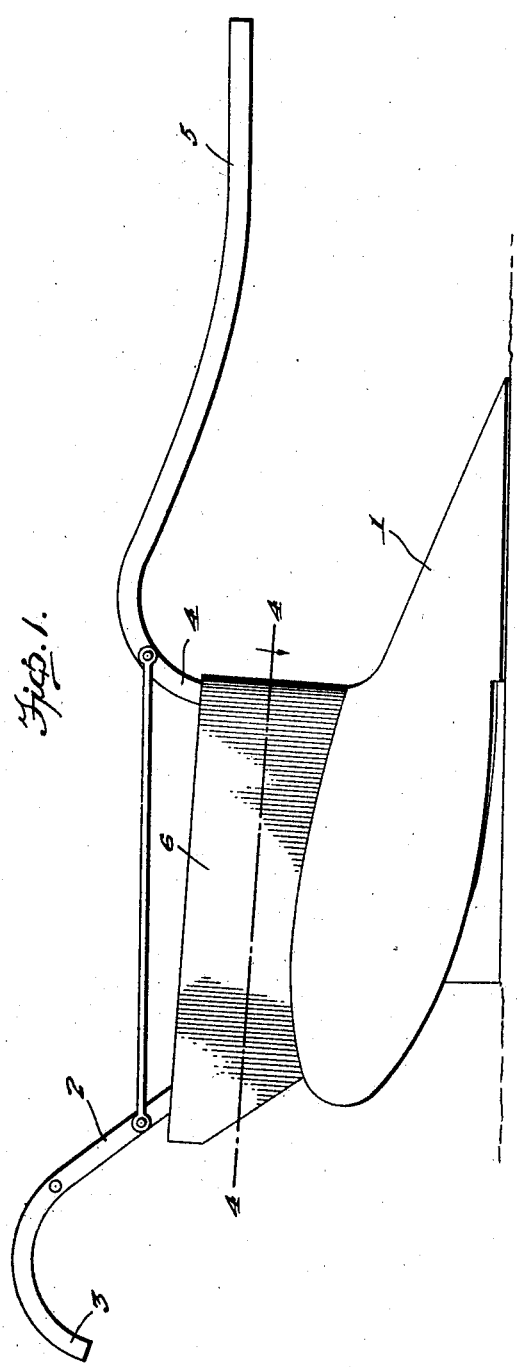
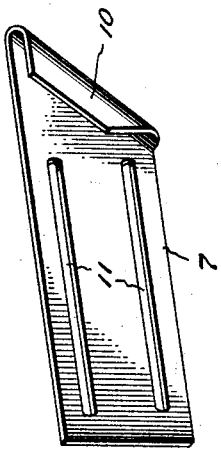
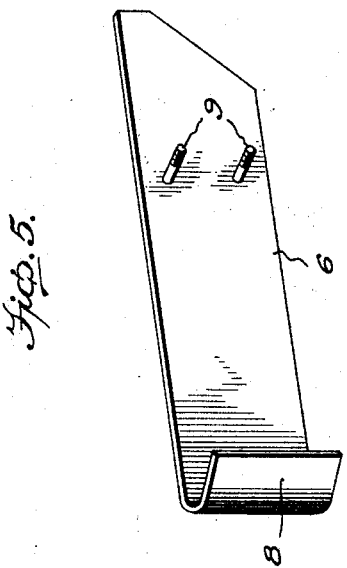
J. A. Ringle INVENTOR
BY Victor J. Evans ATTORNEY J. A. RINGLE.
FENDER.
APPLICATION FILED DEC. 13, 1920.
1,392,223.
Patented Sept. 27, 1921.
2 SHEETS—SHEET 2.
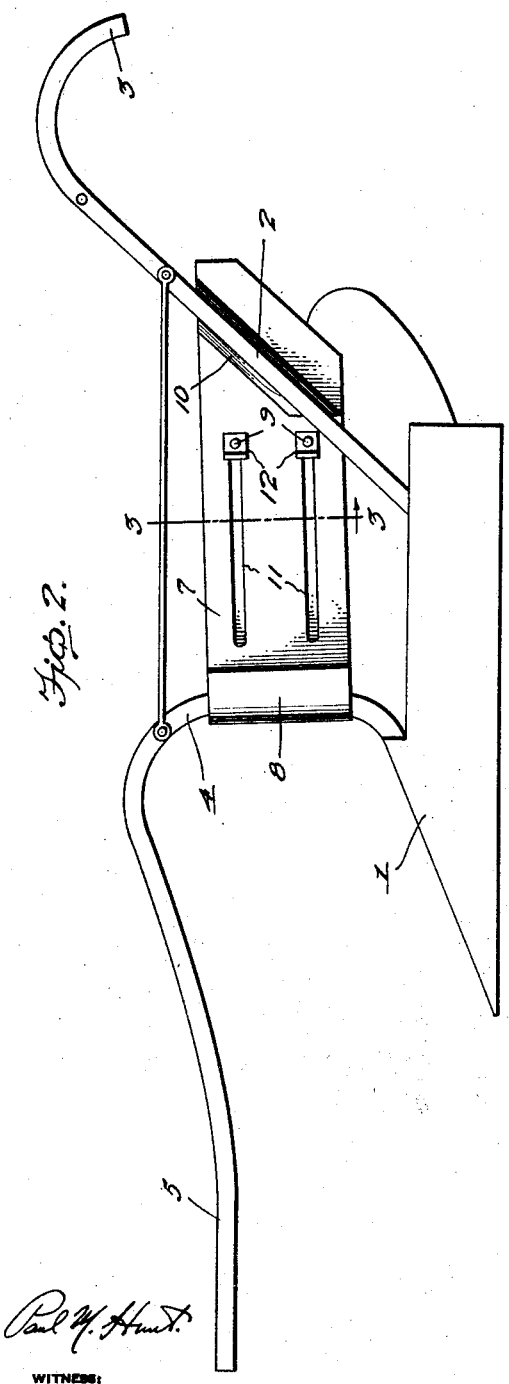
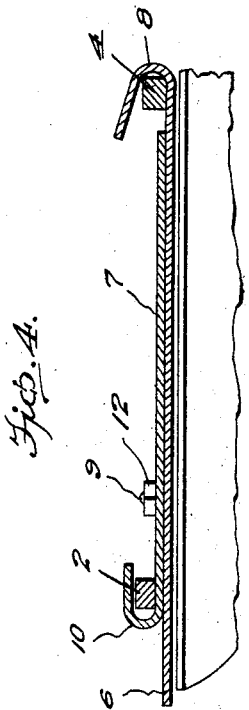
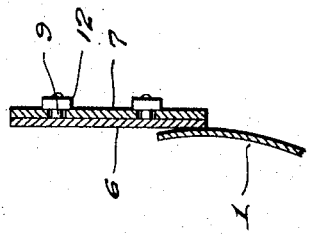
J. A. Ringle INVENTOR
BY Victor J. Evans ATTORNEY
WITNESS:

UNITED STATES PATENT OFFICE.

JAMES A. RINGLE, OF HOXIE, ARKANSAS.

FENDER.

1,392,223.

Specification of Letters Patent. Patented Sept. 27, 1921.

Application filed December 13, 1920. Serial No. 430,400.

*To all whom it may concern:*

Be it known that I, JAMES A. RINGLE, a citizen of the United States, residing at Hoxie, in the county of Lawrence and State of Arkansas, have invented new and useful Improvements in Fenders, of which the following is a specification.

My present invention has reference to plows.

My object is to provide a plow with a shield or fender designed to prevent grass, stalks, roots and clods from falling over the mold board and becoming lodged in the frog or back of the plow.

A further object is the production of a fender of this character which is of an adjustable nature, whereby the same may be readily attached to any ordinary construction of plows.

The foregoing, and other objects which will appear as the nature of the invention is better understood, may be accomplished by a construction, combination and operative arrangement of parts, such as is disclosed by the drawings which accompany and which form part of this application.

In the drawings:—

Figure 1 is a view looking toward the mold board side of a plow that is provided with the improvement.

Fig. 2 is a view looking toward the opposite side of the plow.

Fig. 3 is a sectional view on the line 3—3 of Fig. 2.

Fig. 4 is a sectional view on the line 4—4 of Fig. 1.

Fig. 5 is a perspective view of one of the sections of the fender.

Fig. 6 is a similar view of the other section.

While in the drawings I have illustrated my improvement applied to an ordinary hand plow, it is to be understood that the same may be applied with equal efficiency to sulky or traction plows.

In the drawings, a plow is indicated by the numeral 1, the same having at its rear the usual inclined bars that terminate in the downwardly rounded portions that constitute the handles. The body portions of the handles are indicated by the numeral 2, and the handles proper by the numeral 3. At the front of the plow is the upwardly directed rounded end 4 of the beam 5. Between the end 4 of the beam 5 and one of the body portions of one of the handles 3 there is connected, on the share side of the plow my improved fender. As disclosed by the drawings, the fender comprises two members which are indicated for distinction by the numerals 6 and 7 respectively. Both of the members are in the nature of flat plates, each having one of its ends rounded upon itself to provide a lip. The lip for the outer member 6 is indicated by the numeral 8 and is designed to be arranged over the rounded inner end 4 of the beam 5. The member 6 is of a length approximately equaling that of the plow share, and preferably has its rear end cut at an angle. The member 6 is provided, at spaced intervals with threaded lugs 9 directed outwardly from the inner face thereof. The lip of the member 7 is indicated by the numeral 10 and is arranged at an angle so that the same can snugly receive therein the angularly disposed body portion 2 of one of the handles 3. The member 7 is provided with spaced elongated slots 11 through which the respective lugs 9 pass, and these threaded lugs are engaged by nuts 12 which contact with the inner face of the member 7 to the opposite sides of the slots 11.

The elements 9, which I have referred to as lugs may, of course, be in the nature of short bolts, and the nuts 12 may bind against washers which contact with the inner face of the fender member 7. The fender is arranged above the upper edge of the plow share and will effectively prevent the passage of the plow material over the mold board.

What I claim is:—

A fender for plows, for the purpose set forth, comprising two plates arranged in contacting relation, the outer plate having one of its ends rounded upon itself to provide a lip to engage with a portion of the plow, said outer member having spaced inwardly projecting threaded elements, the inner member having one of its ends bent upon itself to provide an angle lip to engage with a part of the plow, said inner member having elongated slots through which the threaded elements pass, and nuts on said threaded elements contacting the inner member and binding the same against the outer member.

In testimony whereof I affix my signature.

JAMES A. RINGLE.